Sept. 17, 1935.  I. HARRISON  2,015,012
METHOD OF SANDING CRANBERRY BOGS
Filed May 18, 1934  2 Sheets-Sheet 1

Sept. 17, 1935. I. HARRISON 2,015,012
METHOD OF SANDING CRANBERRY BOGS
Filed May 18, 1934 2 Sheets-Sheet 2

Inventor:
Isaac Harrison
by his Attorneys
Howson & Howson

Patented Sept. 17, 1935

2,015,012

UNITED STATES PATENT OFFICE 2,015,012

METHOD OF SANDING CRANBERRY BOGS

Isaac Harrison, Crosswicks, N. J.

Application May 18, 1934, Serial No. 726,376

3 Claims. (Cl. 47—58)

This invention relates to a method of sanding cranberry bogs, and more specifically to a means for applying to the surface of the bog a uniform layer of sand.

Sanding cranberry bogs is desirable for several reasons, the principal of which is that propagation of cranberry vines is principally by means of runners which extend over the surface of the bog, taking root at intervals and sending up uprights which bear the fruit. If these runners can be covered with a thin layer of sand, the rooting is promoted at more frequent intervals and, consequently, a greater number of uprights and a heavier yield results. Additionally, the yearly coating of a bog is desirable in that this coating, if uniform, will cover rotted vegetation on the surface of the bog and inhibit the spread of fungus diseases ordinarily derived from such vegetation. Heretofore, the only method of covering the bog with sand was after draining the bog to transport the sand over the surface and hand-spread it. This method has serious disadvantages, the principal among which lies in the fact that a uniform covering is difficult to obtain and the transportation and manipulation of the sand result in severe breakage to both plants and runners. Since it takes from one to two years for new uprights to grow to producing age through the sand layer when applied, the damage to the bog resulting from this method of sanding is a very serious consideration temporarily resulting in heavy crop losses.

An important object of the present invention is the provision of a method of sanding these bogs whereby a uniform layer of sand may be distributed over the surface of the bog without any damage to either the plants or runners.

A further object of the invention is the provison of a method which permits the sanding of the bog at a time when other work upon the bog is impossible; i. e., the period when the bog is flooded.

These and other objects I attain through use of the apparatus shown in the accompanying drawings wherein, for the purpose of illustration, I have shown a preferred form of the apparatus utilized in carrying out my method and wherein:

Fig. 5 is a diagrammatic view illustrating the method of securing accurate joinder between sanded areas and controlling and determining the position of the barge.

Figure 1:
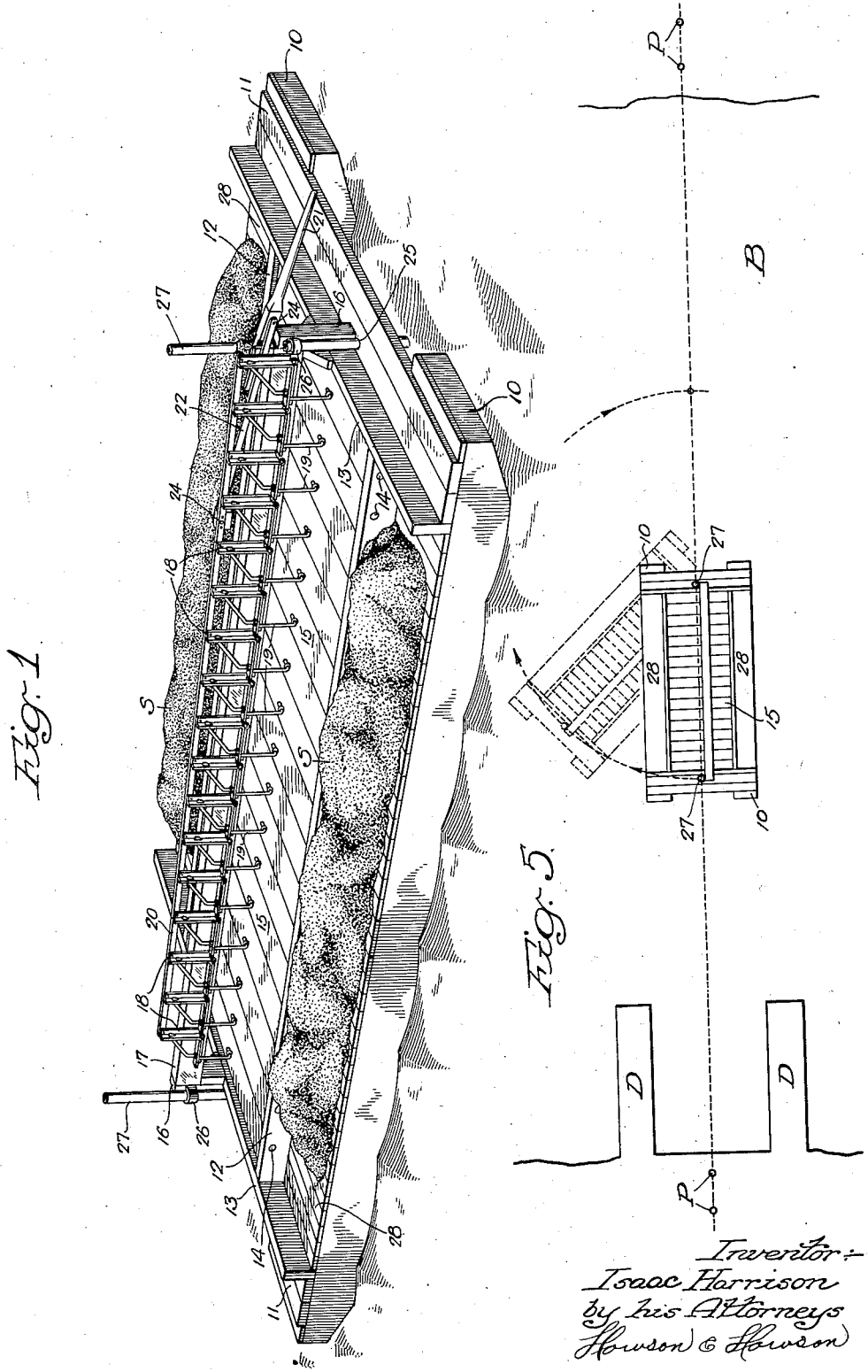
Fig. 1 is a perspective view of sanding apparatus constructed in accordance with my invention.
Figure 2:
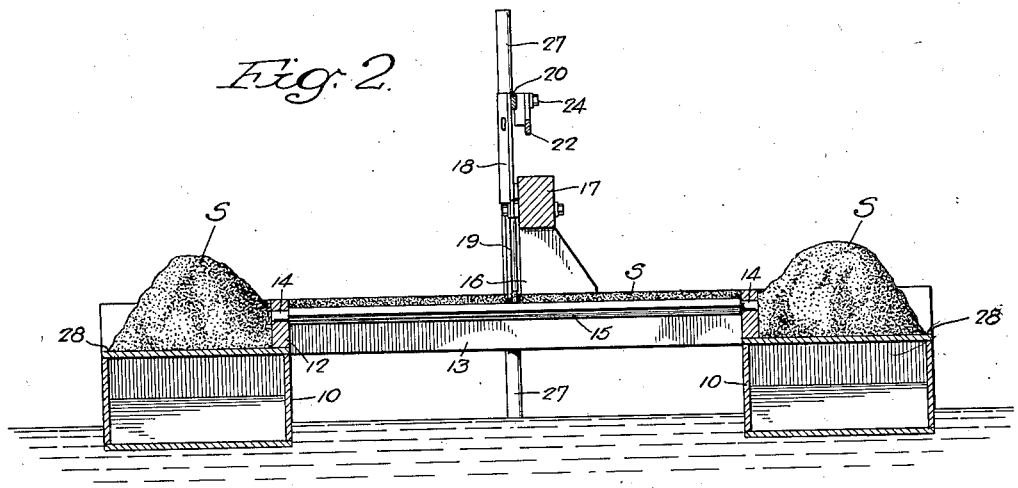
Fig. 2 is a transverse sectional view through the apparatus taken on the line approximately indicated by the line 2—2 of Fig. 3.
Figure 3:
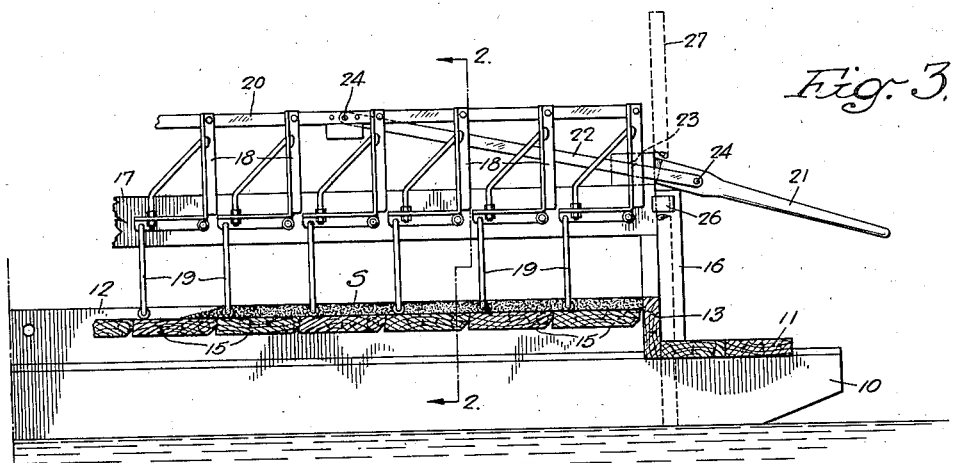
Fig. 3 is a fragmentary longitudinal sectional view through the apparatus, the parts being shown in the position which they occupy when preparing the sand for distribution.
Figure 4:
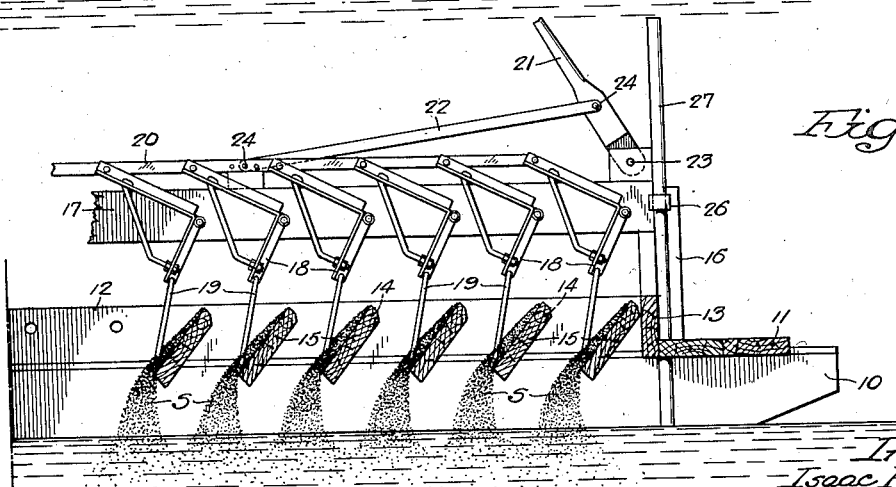
Fig. 4 is a similar view showing the actual distribution.

Referring now more particularly to the drawings, the apparatus comprises a barge of the catamaran type including two pontoons 10 connected at their ends by cat-walks. The inner edge of each pontoon between the cat-walks is defined by a longitudinally-extending beam 12, which beams 12 abut at their ends transversely-extending beams 13 and combine therewith to define a central rectangular opening overlying the space between the pontoons 10. Pivoted as at 14 in the beams 12 are a series of slat members 15 which, as more clearly shown in Figs. 3 and 4, may be moved from a horizontal position in which they define the bottom of a chamber to a downwardly inclining position in which they will permit the escape of the contents of the chamber.

Means are provided for simultaneously moving the slats from one to the other of these positions, such means being at present shown as comprising a pair of vertical standards 16 arising from the cat-walks and connected by a longitudinally-extending bar 17, a plurality of bell crank levers 18 pivoted to the bar 17 and each having one arm thereof connected to an underlying slat by a link 19, a single link 20 connecting the remaining arms of all of the bell crank levers, an operating lever 21 and a link 22 connecting the operating lever with the common link 20 of the bell crank levers. The operating lever 21 has its pivot 23 so arranged that when the slats 15 are arranged in their platform-forming position a line connecting the pivots 24 of link 22 lies below the pivotal connection 23 so that the slats which at this time are supported from the bell crank levers, act to cause a downward movement of the lever 21. Lever 21, however, at this time abuts the upper end of the standard 16 at this end of the barge with the result that the lever and link connections constitute a locking mechanism for maintaining the slats in their elevated or platform-forming position. However, the slight movement of the lever 21 will break the locking connection, permitting the slats and their superimposed load to move downwardly by gravity.

For a purpose presently to appear, each catwalk is provided, in immediate proximity of the ends of the chamber the bottom of which is formed by slats 15, with an opening 25, and immediately above this opening with a guide ring 26, the opening and guide ring being adapted to receive an anchor pole 27 at either end of the barge.

In use of the apparatus, the decks 28 of pontoons 10 are loaded with sand S. To this end, an end of each bog B is equipped with a double dock D between the arms of which the barge may be disposed. Sand distribution is made in straight paths across the bog, a pair of guide poles P being disposed at either or both ends of the bog to serve as siting lines. At a given location, the barge is anchored with its anchor poles 27 in alignment with a pair of siting poles P. Sand from the decks is shoveled onto the platform formed by slats 15 to the desired depth and leveled upon this platform, following which the lever 21 is actuated to release the slats and permit the contents of the chamber to be deposited on the surface of the water through which it sifts downwardly dispersing, due to the action of the water upon the granules, and finally arriving upon the bottom surface in an even layer. One of the anchor poles 27 is then removed and the barge poled around until the anchor pole can be reinserted with both anchor poles 27 in alignment with the same set of siting poles. During the shifting of the barge, the platform may be restored and the supply on the platform replenished so that the operation can be fairly rapidly carried out.

When sand has been evenly applied on a band across the entire bog, the siting poles P are shifted and the operation continued on the new path. It will be seen that by following this method a smooth, even layer of sand can be applied to the entire bottom of the bog without leaving any gaps or uncovered places exposing the rotting vegetation when the water has been finally drained from the bog. Furthermore, due to the fact that a fine layer of sand has been sifted down through the water, it forms a very homogeneous layer in close contact with the soil of the bog so that there is little danger of this layer becoming dried out due to constant moistening of the particles thereof through capillary attraction. On the contrary, where loose sand is applied to the surface of the bog, there is considerable danger of the layer drying and causing extensive damage to the plants. Due to the fact that this operation can be performed while the bog is flooded, it occurs at a period when no other work is possible on the bog and, accordingly, will not in any way interfere with normal operations on the bog. Any particles of sand which may lodge on the plants proper will be of very slight weight and will soon become dislodged therefrom due to the movement of the water of the bog and so arrive at their proper position on the bog.

It may be here pointed out that the method herein described may be conveniently employed in planting new bogs or in replanting where it is necessary. In the ordinary planting methods the field is either strewn with bits of the vines which are disked into the soil or bits of the vine are introduced to the soil by dibbing. Either of these methods is objectionable in that portions of the vines are too deeply buried to enable them to properly develop the eyes from which the new roots spring so that there is considerable waste of cuttings. The ideal planting method is to shallowly cover the bits of vines so that the eyes may develop rapidly and more uniformly. Employing my apparatus, the vines are strewn upon the surface of the bog which is then flooded and the sanding operation carried out.

While the construction illustrated provides an arrangement whereby the method can be conveniently carried out, I wish it to be understood that this structure is purely illustrative and is capable of a wide range of modification without in any manner departing from the spirit of the invention.

What I claim is:

1. The method of planting cranberry bogs comprising strewing short lengths of vines over the surface of the bog, flooding the bog and immediately thereafter uniformly distributing sand over the surface of the water flooding the bog.

2. The method of sanding cranberry bogs comprising distributing sand in equal quantities per unit area of bog surface upon the surface of the bog through a liquid medium covering the bog.

3. The method of sanding cranberry bogs comprising flooding the bog with water and distributing sand from a floating sand-distributing barge in equal quantities per unit area of the surface of the bog through the water covering the bog.

ISAAC HARRISON.